Dec. 28, 1943. M. M. BERRY 2,337,706
PEDAL-CONNECTED HYDRAULIC RUDDER SYSTEM
Filed May 5, 1941 2 Sheets-Sheet 1
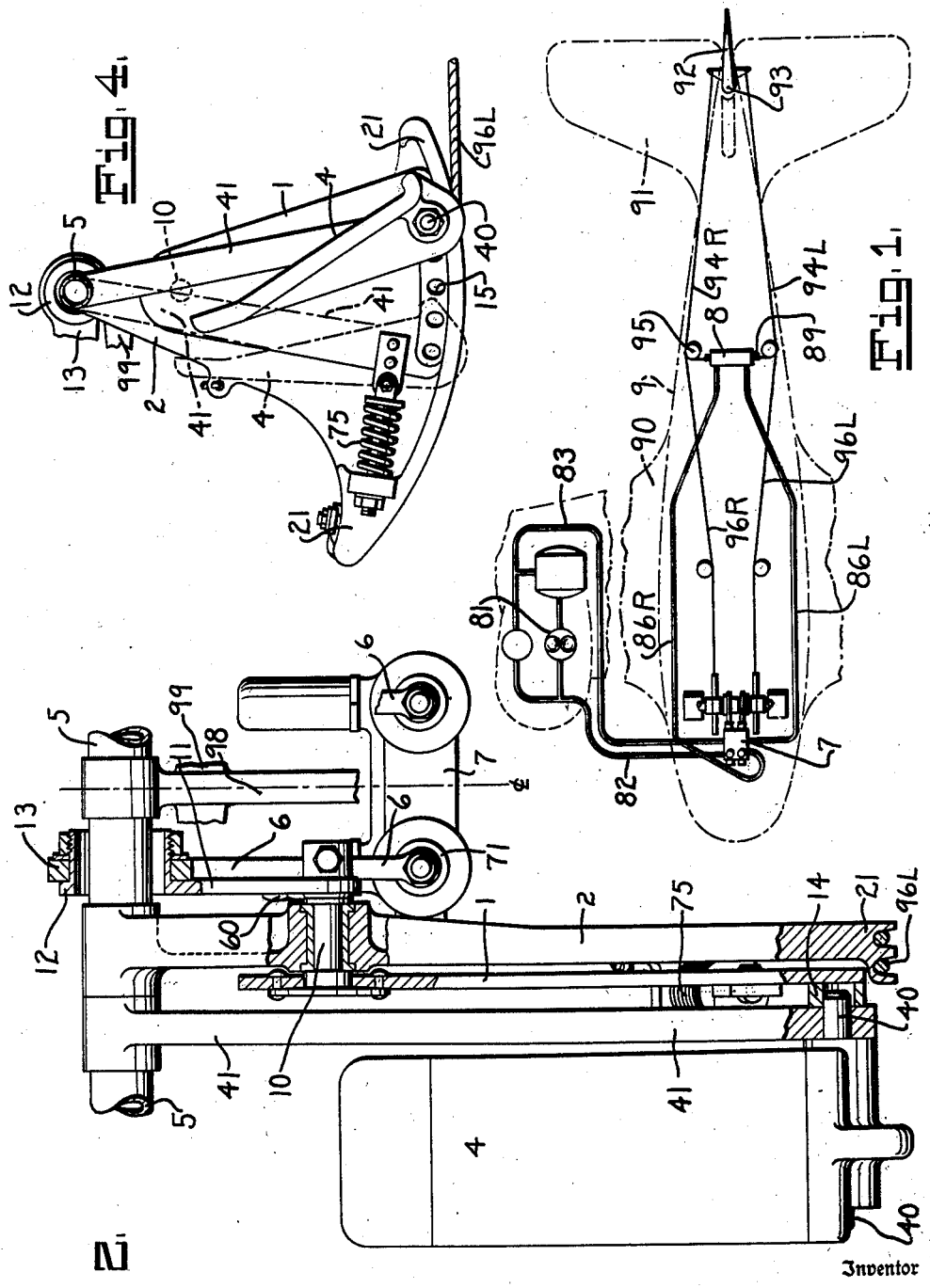
Inventor
Mitchell M. Berry
By Reynolds Beach
Attorneys Dec. 28, 1943.  M. M. BERRY  2,337,706
PEDAL-CONNECTED HYDRAULIC RUDDER SYSTEM
Filed May 5, 1941  2 Sheets-Sheet 2
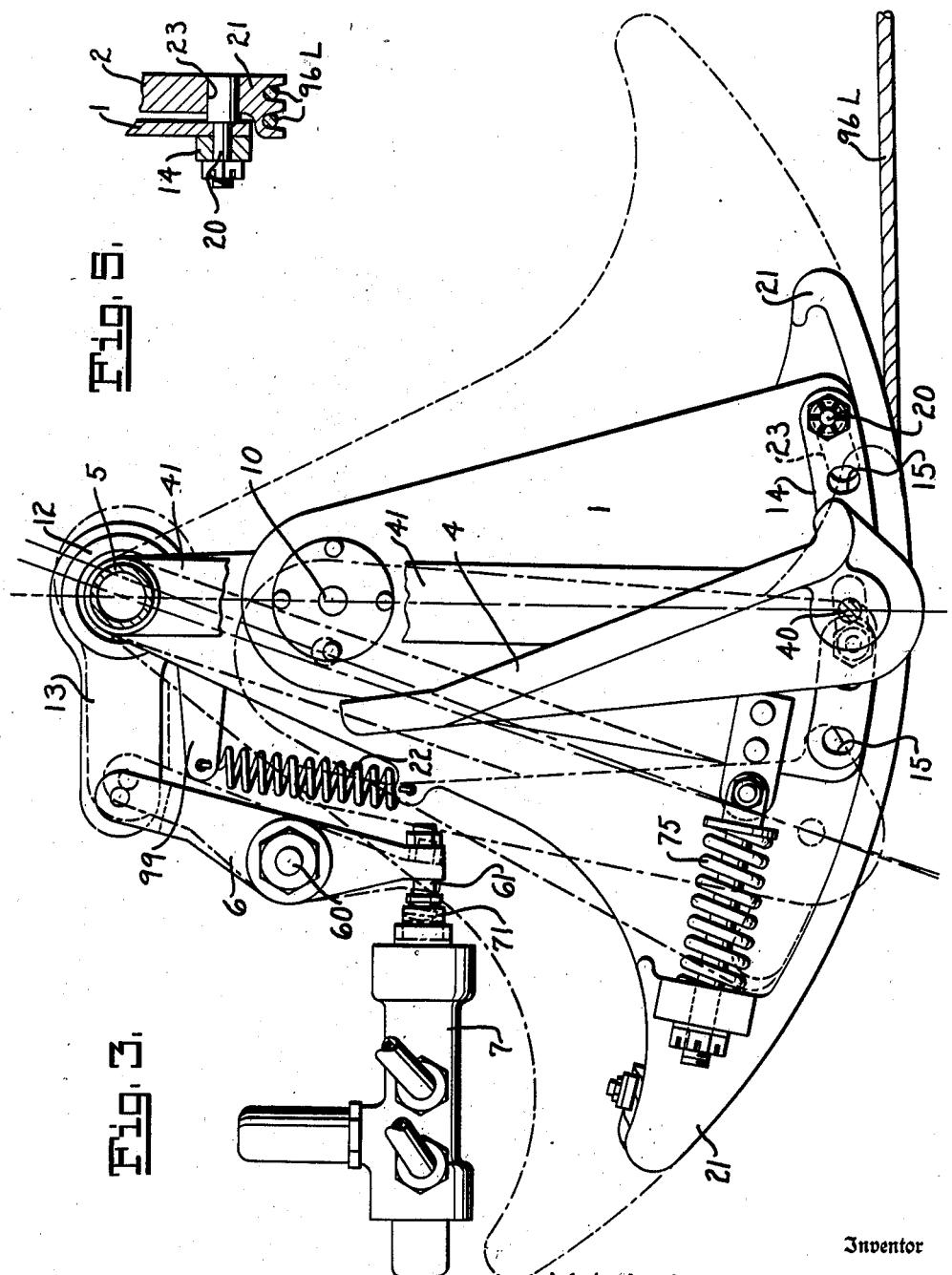
Inventor
Mitchell M. Berry
By Reynolds Beach
Attorneys Patented Dec. 28, 1943

2,337,706

UNITED STATES PATENT OFFICE 2,337,706

PEDAL-CONNECTED HYDRAULIC RUDDER SYSTEM

Mitchell M. Berry, Seattle, Wash., assignor to Boeing Aircraft Company, Seattle, Wash., a corporation of Washington Application May 5, 1941, Serial No. 391,865

6 Claims. (Cl. 244—86)

In my copending application, Serial No. 370,162, filed December 14, 1940, is disclosed a boost control valve whereby a pressure fluid may be supplied under control to a jack which is operatively connected to a control surface such as a rudder, thereby to cause the rudder to swing, involving also a follow-up means reacting from the rudder and serving as an emergency direct connection, the system incorporating a variable resistance such that the pilot's control element must be necessarily held in its position of departure from its initial position, corresponding to the departure of the control surface from its initial or neutral position, with a force which is in ratio to but less in amount than the forces acting upon the control surface and tending to restore the latter to its initial position. In this manner the pilot retains the "feel" of the control surface, but is enabled to move the same in opposition to the total of the aerodynamic forces acting upon the control surface. There are also disclosed in that application various forms of boost valves for controlling the energization of the hydraulic jack which acts as the servo means.

The general objects of the present invention, and to a considerable extent the manner of realizing the same, are identical in the present invention. However, the present arrangement is designed to incorporate certain details and improvements not realized in the former arrangement. In order that the control surface may be swung by a servo device located closely adjacent the control surface and connected by short and strong mechanical means to the control surface, yet may be operated by a valve or similar means controlling the energization of the servo device, which valve means is located closely adjacent the pilot's control element, such as the pedals when the control surface is a rudder, the present arrangement has been devised. By thus arranging the elements, and connecting them by hydraulic lines, the arrangement is freed of all mechanical lag, lost motion, and system friction, and is made more instantaneously and directly responsive to movements of the rudder pedals, which are now directly and mechanically connected to the boost valve, which latter is connected by hydraulic conduits or the like to the jack or servo device, and the latter in turn is connected mechanically and directly to the rudder. Thus all distant connections in normal use may be purely by means of hydraulic conduits, which impose no stress upon the aircraft structure, as opposed to control cables or the like extending from the pedals to the rudder, or even to a boost valve, and the points of stress are localized in structure best adapted by reason of normal design requirements to withstand them. In so doing the entire arrangement is simplified, and made more reliable and more quickly and surely responsive to the will of the pilot, and reliance on heavy return or centering springs is obviated.

At the same time, by the arrangement illustrated, these results can be achieved with mechanism which departs but slightly from the normal construction of the rudder pedals, and which permits the normal adjustment of the rudder pedal and its normal operation for braking purposes.

There is also provided a direct mechanical connection between the pedal and the adjacent boost valve, normally inoperative but operative when, due to resistance between the pedal and the rudder, it is essential to effect movement of the rudder through the pedal, possibly by means of the boost valve and servo jack, and possibly by means of the cables normally serving as follow-up means, in case of failure of the servo arrangement.

In the former arrangement the boost valve, jack, and the associated parts were located in the open, and were subject to temperature variations of such range, and to low temperatures of such intensity, that the intended operation of the valve and of the system as a whole was adversely affected. hence another object is to arrange all hydraulic parts within the airplane. where their temperature may be kept more nearly uniform, and above that at which failure to operate may be expected, to the end that their operation will be more uniform and reliable.

With these and other objects in mind, as will appear as this specification progresses, my invention comprises the novel parts, and the novel combination and arrangement thereof, relative to each other and relative to the normal elements of an aircraft, all as shown in the accompanying drawings in a preferred form, and as will be further pointed out and particularly defined by the claims which terminate this specification.

Figure 1 is a shadow view in plan of an airplane, showing in full lines, and diagrammatically, the essence of the present system.

Figure 2 is an elevation looking forwardly from the pilot's seat, illustrating a rudder pedal and the associated operating mechanism, and Figure 3 is a side elevation of the same, parts being broken away in each figure for better illustration.

Figure 4 is a view similar to Figure 3, showing parts in a different position of adjustment.

Figure 5 is a detail section on the line 5—5 of Figure 3.

Referring to Figure 1, the airplane, with its fuselage 9, sustaining wings 90, and empennage generally indicated at 91, has a control surface which may be typified by the rudder 92, although the same principles may be applied to other control surfaces. The rudder 92 is mounted to swing about a hinge line which may be taken to be at 93. Controls 94R and 94L, which may be cables or any equivalent mechanical means, are connected to swing the rudder in opposite directions, and connect to the opposite ends of the plunger 89 of a double-acting hydraulic jack 8. The cables 94R and 94L are led over suitable guide pulleys or the like, indicated at 95. Extensions 96R and 96L of these cables extend forwardly to the pilot's station, whereby these extensions 96R and 96L partake of the movement of the rudder 92, imparted thereto by energization of the jack 8 in one direction or the other.

The jack 8, as illustrated, is a hydraulic jack. Fluid is supplied under pressure to the opposite ends of the jack through conduits 86R and 86L, through valve mechanism, illustrated generally at 7, from a pressure source, typified by the pump 81 and its supply and circulating system including the pressure line 82 and the return line 83.

The location of the jack with relation to the valve 7, on the one hand, and the control surface 92, on the other hand, must be a compromise between two conflicting considerations. If the jack 8 were located closely adjacent the valve 7 there could be no possibility of hydraulic lag in the conduits 86R and 86L, but in such an installation the cables 94R and 94L, between the jack and the control surface, would be necessarily long. Since in certain instances or under certain conditions the loads on these cables may be extremely high, for instance 2000 pounds or more, and these cables would be necessarily conducted by somewhat devious paths, it would be necessary to materially strengthen the entire structure, and the points where the guide pulleys would be located, in order to take these maximum cable loads. In this arrangement, too, there would be some mechanical lag. On the other hand, the jack might be placed so far to the rear that it would not be properly protected from low temperatures, particularly at high elevations, and hence uniformity or complete reliability of operation could not be assured. In the latter type of installation also there would be hydraulic lag between the valve and the jack. For installations where the cable loads may be high, a rearward location is preferred, somewhat more so than can be conveniently shown in the exaggerated diagram, Figure 1, but at the same time the jack should be located inside the aircraft structure in such a location that it is protected from low temperatures. If in a given installation the cable loads are negligible under all conditions the jack might well be located close to the valve 7.

The valve mechanism, indicated at 7, may be any that is found suitable, and conveniently and preferably it is of such nature as is shown and described in detail in my copending application, Serial No. 370,162, filed December 14, 1940. Because of the disclosure there, and because the particular construction of the valve means at 7 is not important to the present invention as a whole so long as the valve mechanism has within it or associated with it means whereby the manual or pedal means to open it may be resisted with a force which is proportional to but less in amount than the air loads upon the control surface 92 that swings in response to the operation of the valve, I have not deemed it necessary to illustrate the valve in detail in this application, and reference is made to my copending application above for such details.

The present invention is concerned more particularly with the relative arrangement of the parts as a whole in their relationship to each other and to the parts of the aircraft structure, and in particular to the relationship and arrangement of the parts in association with the pedals which are the normal devices for swinging the rudder 92. Such pedals are ordinarily employed for two purposes—the swinging of the rudder when in flight, and the operation of the wheel brakes when ground-borne. It must be remembered that these rudder pedals must be adjustable in their initial position to accommodate pilots who are short-legged and those who are long-legged. These functions and capabilities must still be preserved even though the pedals are not directly and mechanically connected for normal operation of the rudder.

The rudder pedal is indicated at 4. Two such pedals are provided, of course, but for most purposes a description of one will suffice. Such a pedal is rockably mounted at its lower end at 40, and by rocking about this axis the wheel brakes may be applied, by means not here illustrated, but known in the art. It is also swingably mounted for to and fro movement for the control of the rudder, and may be considered as carried at the lower end of a stirrup 41 which is carried upon and swingable about the axis of a shaft 5 supported in suitable brackets 98 above the path of swing of the pedal 4. The stirrup 41 is loose upon the shaft 5 and moves freely with respect thereto; its whole function is to guide the immediate pedal support, the pin 40, for swinging in a definite arcuate path, and to bear the immediate forces applied to the pedal by the foot.

Alongside the stirrup 41 and coaxial therewith is a quadrant arm 2 which is mounted upon the shaft 5 to swing thereabout, provided with an arcuate end 21, about which one of the cable extensions 96R or 96L is connected. There is no direct normal connection between the pedal 4 and the quadrant arm 2, although there is a direct mechanical connection, by way of the cable 96L, for instance, between the quadrant 21 and the rudder 92. This connection is not the normal operating connection for the rudder, but normally is a follow-up means. However, in case of emergency it is available, and will be designed in such manner, that the pilot can operate the rudder within the limits of his physical ability through the cables 96R and 96L, should the power means fail.

Carried upon the quadrant 2, intermediate the ends of the latter, is a lever, one arm of which is indicated at 1. This lever is pivoted upon the quadrant arm 2 at 10, and its opposite arm 11 preferably extends upwardly to and is formed with a loop 12 surrounding but spaced from the shaft 5, so that this arm 11 may move relative to the shaft without interference. On this end is pivoted a link 13, as shown in Figure 2, which extends laterally, as indicated at 13 in Figures 3 and 4.

The pedal 4 might well be directly connected with the lower end of the lever 1 to swing the latter with respect to the quadrant arm 2, except for the fact that it is necessary to effect forward and rearward adjustment of the initial position of the pedal 4 with respect to the lever 1 and the arm 2. It is therefore necessary to effect a somewhat indirect connection between the pedal 4 and the lever 1, although for ease of understanding the operation the two may be considered as directly connected.

For the purpose of pedal adjustment, however, there is provided upon the lower end of the lever 1, concentric with the axis of the shaft 5, an arcuate bar 14, centered on the shaft 5, and having a plurality of holes 15 within any one of which the pivot pin 40 of the pedal 4 may be secured, thus locking together the pedal's rocking center 40, its stirrup 41, and the lever 1, and determining the pedal's fore and aft position. The pin 40 may be axially withdrawn in opposition to a spring, as is known practice, and reengaged by releasing it, when the pedal is swung, with its stirrup, to the desired position of adjustment.

There is also a connection between the lever 1 and the arm 2, but a connection which permits a limited degree of relative movement. This may be accomplished by means of a bolt 20 received in the lever 1, and conveniently passing through its segmental bar 14, and received in a slot 23 in the arm 2 which is arcuate about the center of the pivot 10 of the lever. By such means the lever 1 may swing about its center 10 upon and relative to the quadrant arm 2, and yet when the limit of the relative movement permitted by the bolt 20 and arcuate slot 23 is reached the pin bottoms at the end of the slot to provide a positive connection between the lever and the quadrant, and hence between the pedal and the quadrant, and the quadrant, it will be remembered, is directly connected, as by the control cable 96L, to the rudder 92.

The link 13 on the upper end of the lever is connected to the valve means 7. Such a connection may be, for instance, the rock arm 6 pivoted at 60, which by means of its adjustably positioned pusher 61, engages the plunger 71 of the valve means 7.

So far the description has encompassed only a single pedal and a single valve of the valve means. However, it is understood that two pedals are provided, and two valves are provided in the valve means, so connected that when one or the other valve is operated the jack 8 is energized to cause swinging of the rudder 92 in one direction or the other, depending upon which of the valves is operated. Moreover, by the lost motion provided in the pedal connections, the pedal moves prior to any movement of the arm 2 and with respect to the latter, whereby to operate the corresponding valve plunger 71, and by this means effecting energization of the jack and corresponding movement of the rudder. This movement of the rudder acts through the controls 94L and 94R and the extensions 96L and 96R, respectively, to swing the quadrant arms 2 correspondingly to the movement of the rudder, and this acts as a follow-up tending to swing the quadrant 2 of the particular pedal which effected energization in the same direction as this pedal was moved, and simultaneously swings the other quadrant 2, and in turn its rudder pedal, oppositely. The two rudder pedals therefore move oppositely and substantially equally, as is conventional, during operation thereof. As long as a pedal is held in a forward position the valve means is so arranged internally that there is still some load imposed upon the pedal resisting its movement, this force acting in the same manner as the air loads upon the swung rudder, but in less degree.

A spring 75 is used purely for the purpose of overcoming any frictional resistance in the quadrant linkage, and to center the arm 1 in relation to the quadrant at such times as the foot pressure is relieved. The valve mechanism will normally contain a return spring which will operate upon the valve mechanism, upon relief of foot pressure, but it is not desired that this valve spring, when employed, operate on anything other than the valve assembly. This centering by the spring 75 is therefore necessary in order that the valve mechanism may return to its neutral or open position, uninfluenced by any frictional resistance in the quadrant linkage, thus permitting the pressure previously metered to the actuating cylinder 8 to be relieved, and in turn permitting the air load on the control surface to return this control surface to its neutral position.

A spring 22 between the arm 2 and a fixed bracket 99, acting in conjunction with a similar spring upon the opposite pedal assembly, serves to return all parts to neutral initial position, and to draw or hold the quadrant to the left, when the pin 40 is withdrawn for adjustment of the pedal's position. This is common practice in such pedal assemblies.

Figure 4 illustrates how, by engagement of the pin 40 in a different hole 15 of the segment bar 14, the position of the pedal may be adjusted for a short-legged pilot. This adjustment in no wise affects the operative relation between the pedal 4 and the lever 1 or the arm 2.

By this arrangement the boost valve is so located that it is immediately responsive to movement of the pedals, and the hydraulic impulse controlled thereby is transmitted substantially instantaneously, but without any application of force to the structural parts of the aricraft, to the jack which is located in the reinforced portion of the tail of the fuselage. There this hydraulic force is changed again into a mechanical force, and by short, direct mechanical connections is applied to the rudder, causing the latter to swing in the direction corresponding to that in which the pedal was moved. This movement of the rudder reacts through the cables and quadrants, and causes swinging of the two arms 2, one for each pedal, and this movement acts to follow up the movement of the initiating pedal and to close the valve. However, unless the pedal is held deflected from its initial position with a force which is in ratio to the air loads upon the rudder, but less in amount, these air loads upon the rudder will cause an over-following, and will result in reverse operation of the servo mechanism and swinging of the rudder back towards or to its initial neutral position. It follows that with the present arrangement, including the boost control valve, the pilot still retains the "feel" of the control surfaces, and must hold them in a deflected position by pressure on the pedals, just as in any directly mechanically connected control system, yet has the advantage of the power mechanism to assist in swinging the control surface against the very large loads imposed by the size of the control surface itself and the other aerodynamic factors which in large present-day airplanes make it substantially impossible for the pilot to continue to operate the controls by direct mechanical force. However, should the power means fail the pilot still has at his command mechanical means which in such an emergency, and for a relatively short time, can be employed to effect sufficient control of the rudder. The hydraulic mechanism is enclosed, where it can be kept of reasonably constant temperature, and not subject to wide variations of viscosity.

What I claim as my invention is:

1. Operating mechanism for an aircraft control surface comprising a rockable arm, mechanical means directly connecting said arm to the control surface, hydraulic means, including a control device disposed adjacent said arm, operatively connected to said control surface, a pedal, a pedal-operated arm pivoted upon said first-mentioned arm, upon an axis spaced outwardly from the latter's axis, means closely coupling said pedal and said pedal-operated arm for conjoint movement, and means operatively connecting said pedal-operated arm and said control device for actuating the latter by swinging the pedal operated arm relative to said rockable arm to effect movement of the control surface under the influence of the hydraulic means, said mechanical means being operated by such movement of the control surface to effect reflected and corresponding movement of the rockable arm tending to return said pedal-operated arm to its initial position relative to said rockable arm.

2. Mechanism as in claim 1, including a positive lost-motion connection between the two arms definitely limiting the degree of their relative swinging movement, continued swinging of the pedal-operated arm thereby effecting conjoint swinging of the rockable arm therewith to constitute a positive operating connection between the rockable arm and the mechanical means connected to the control surface in the event of failure of the hydraulic means.

3. Operating mechanism for an aircraft control surface comprising a rock shaft, a first, a second, and a third arm, all disposed side by side for swinging movement in planes perpendicular to the axis of the rock shaft, the first and second of said arms being swingable about the rock shaft's axis, and the third being mounted for oscillation upon the second arm, about an axis spaced outwardly of the rock shaft's axis, a pedal upon the first arm, means interconnecting said first and third arms, operable to move said third arm relative to said second arm by movement of said first arm, and adjustable to dispose said first arm in its plane of swing in various angular positions relative to the third arm to establish different initial pedal positions, hydraulic means operatively connected to the control surface, and further operatively connected to said third arm for operation by oscillation thereof relative to said second arm, and follow-up means operatively inter-connecting said control surface and said second arm, and operable to move the second arm, by movement of the control surface, in a direction to move said third arm relative to said second arm oppositely to the movement thereof effected by said first arm.

4. Operating mechanism as in claim 3, wherein the follow-up means is formed as a positive mechanical connection, and including further a positive lost motion connection between the second and third arms, permitting limited relative movement therebetween, but constituting a positive emergency operating connection, by way of the means interconnecting the first and third arms, between the pedal and the control surface, effective, in the event of failure of the hydraulic means, to move the control surface directly by movement of the pedal.

5. Operating mechanism as in claim 3, wherein the means interconnecting the first and third arms includes an arcuate bar concentric with the rock shaft, carried by the third arm, and having a plurality of angularly spaced stop engaging portions, and a retractable stop carried by the first arm and engageable at will with any selected bar stop engaging portion.

6. Operating mechanism as in claim 3, including a pin carried by one of the second or third arms, and a slot in the other receiving said pin, and arcuate about the third arm's axis of oscillation, and of limited angular extent, whereby the pin will shift in the slot during normal operation, for lost motion, but will bottom in the slot for positive interconnection between said second and third arms in the event of failure of the hydraulic means.

MITCHELL M. BERRY.